United States Patent
Sun et al.

(10) Patent No.: US 12,513,058 B2
(45) Date of Patent: Dec. 30, 2025

(54) NETWORK TOPOLOGY DISPLAY METHOD AND COMMUNICATION APPARATUS

(71) Applicant: HUAWEI TECHNOLOGIES CO., LTD., Guangdong (CN)

(72) Inventors: Changsheng Sun, Nanjing (CN); Yufei Tang, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 163 days.

(21) Appl. No.: 18/521,338

(22) Filed: Nov. 28, 2023

(65) Prior Publication Data

US 2024/0097995 A1    Mar. 21, 2024

Related U.S. Application Data

(63) Continuation of application No. PCT/CN2022/094830, filed on May 25, 2022.

(30) Foreign Application Priority Data

May 31, 2021  (CN) .................. 202110605440.X

(51) Int. Cl.
G06F 3/048 (2013.01)
H04L 41/22 (2022.01)

(52) U.S. Cl.
CPC .................................... H04L 41/22 (2013.01)

(58) Field of Classification Search
CPC ....................................................... H04L 41/22
See application file for complete search history.

(56) References Cited

U.S. PATENT DOCUMENTS

| | | | |
|---|---|---|---|
| 6,697,338 B1* | 2/2004 | Breitbart | H04L 41/12 370/254 |
| 8,995,303 B1* | 3/2015 | Brar | H04L 41/082 370/254 |
| 9,940,423 B2* | 4/2018 | de Lescure | G06F 30/392 |
| 9,972,105 B2* | 5/2018 | Deng | G06F 16/9024 |
| 11,743,138 B1* | 8/2023 | Roy | H04L 41/22 709/220 |
| 12,021,705 B1* | 6/2024 | Sattiraju | H04L 43/045 |
| 12,237,980 B2* | 2/2025 | Cherif | G06F 30/394 |
| 2002/0154175 A1* | 10/2002 | Abello | G06T 11/206 715/853 |
| 2006/0168207 A1* | 7/2006 | Choong | H04L 41/22 709/224 |

(Continued)

*Primary Examiner* — David Phantana-angkool
(74) *Attorney, Agent, or Firm* — Rimon PC

(57) ABSTRACT

Embodiments of this application disclose a network topology display method and a communication apparatus to improve availability and visualization effect of a network management and control system. In one embodiment, a communication apparatus obtains a multi-level subnet topology structure, determines a subnet density of a first network element based on a layout setting of a user for the physical position of the subnet of the first network element in the multi-level subnet topology structure, and then determines a current scale based on a zoom operation performed by the user on a display area. When a product of the scale and the subnet density is greater than a preset value, the communication apparatus expands the subnet of the first network element in the display area.

14 Claims, 6 Drawing Sheets

(56) References Cited

U.S. PATENT DOCUMENTS

| | | | | |
|---|---|---|---|---|
| 2009/0327903 A1* | 12/2009 | Smith | ...................... | H04L 41/22 |
| | | | | 715/737 |
| 2013/0159863 A1* | 6/2013 | Smith | ...................... | H04L 41/12 |
| | | | | 715/734 |
| 2021/0367834 A1* | 11/2021 | Palavalli | ............. | H04L 41/0893 |
| 2022/0200889 A1* | 6/2022 | Cherif | ................. | H04L 45/302 |
| 2025/0047701 A1* | 2/2025 | Siddam | ................... | H04L 41/22 |

\* cited by examiner

NETWORK TOPOLOGY DISPLAY METHOD AND COMMUNICATION APPARATUS

CROSS-REFERENCE TO RELATED APPLICATIONS

This application is a continuation of International Application No. PCT/CN2022/094830, filed on May 25, 2022, which claims priority to Chinese Patent Application No. 202110605440.X, filed on May 31, 2021. The disclosures of the aforementioned applications are hereby incorporated by reference in their entireties.

TECHNICAL FIELD

Embodiments of this application relate to the field of network technologies, and in particular, to a network topology display method and related communication apparatus.

BACKGROUND

A network topology is a physical layout of network elements that are interconnected through transmission media. A network topology is generally obtained based on a connection manner of network elements in a network. In a network topology, a logical relationship of network element devices, a logical relationship of connection devices, a topology relationship of ports, and the like can be displayed in graphics. In a network topology, network element devices, connection devices, and ports are collectively referred to as nodes. The position of a node in a network topology depends on the topology structure of the network in which the node is located, a hierarchical relationship of the node in the network, and the like. Positions of nodes are arranged based on a logical relationship of the nodes. In this way, an entire network topology view is consistent with an actual network topology structure, and a user can manage and maintain an entire network system.

A current network topology is usually constructed manually or automatically in a multi-level tree nested subnet structure. After the multi-level tree nested subnet topology structure is constructed, a topology structure of each network element can be viewed. That is, each time a network element is opened, a topology structure of a subnet under the network element can be viewed.

However, in the current technology, only a single network element can be viewed. The overall network topology cannot be viewed and a cross-network-element service path cannot be viewed. This restricts availability and visualization effect of a network management and control system.

SUMMARY

Embodiments of this application provide a network topology display method and a communication apparatus, to improve availability and a visualization effect of a network management and control system.

A first aspect of this application provides a network topology display method. The method includes: obtaining a multi-level subnet topology structure, where the multi-level subnet topology structure includes network elements at a plurality of network levels; obtaining a layout setting of a subnet of a first network element at each network level, where the subnet of the first network element includes the first network element and subordinate network elements of the first network element, the layout setting is used to adjust a physical position of a subordinate network element of the first network element, and the physical position is an actual position of the subordinate network element of the first network element in an actual coordinate system; determining a subnet density of the first network element based on the layout setting, where the subnet density is a density of the subordinate network elements of the first network element in the actual coordinate system; determining a scale based on a zoom operation performed by a user on a display area, where the scale represents a relationship, e.g., a ratio, of a display distance between network elements and a physical distance corresponding to the display distance, the display distance is a distance between network elements in the display area, and the physical distance is an actual distance between network elements in the actual coordinate system; and expanding the subordinate network elements of the first network element when a product of the scale and the subnet density is greater than a preset value.

In the first aspect, an execution body may be a communication apparatus. The communication apparatus may obtain a multi-level subnet topology structure, where the multi-level subnet topology structure may be an existing topology structure, or may be generated in a customized manner. The user may adjust a physical position of a network element in the multi-level subnet topology structure in the actual coordinate system, and the communication apparatus may determine a subnet density of each network element based on a layout setting after the user completes the adjustment. When the user adjusts a scale of the multi-level subnet topology structure in a current display area by using a zoom operation, the communication apparatus may obtain the scale after the adjustment ends, then multiply the scale by the subnet density, and compare the multiplication result with a preset value. When the multiplication result is greater than the preset value, the subnet of the first network element is expanded. In some embodiments of this application, a network topology can be viewed across levels and network elements, thereby improving availability and visualization effect of the network management and control system.

In a possible implementation, the subnet density is a ratio of an actual coordinate range of the subnet of the first network element in the actual coordinate system to a quantity of subordinate network elements of the first network element.

In the foregoing possible implementation, the subnet density may be obtained by calculating a network element density in the subnet of the first network element.

In a possible implementation, the subnet density is an average value of the connection lengths between the subordinate network elements of the first network element in the actual coordinate system.

In the foregoing possible implementation, the subnet density may be determined based on an average distance between physical positions of the subordinate network elements of the first network element.

In a possible implementation, the step of obtaining a layout setting of a subnet of a first network element at each network level includes: determining a position of a subnet at a highest network level in the multi-level subnet topology structure based on the display area, where the subnet at the highest network level includes a network element at the highest network level and subordinate network elements of the network element at the highest network level; and obtaining a layout setting of a subnet of the first network element at another network level based on the position of the subnet at the highest network level.

In the foregoing possible implementation, to obtain a better layout design of the multi-level subnet topology structure, the position of the subnet at the highest network level in the multi-level subnet topology structure further needs to be determined. The subnet at the highest network level includes a network element at the highest network level, the subordinate network elements of the network element, and the connection relationships between the network element and the subordinate network elements. The communication apparatus may arrange a subnet at another network level based on the position of the subnet at the highest network level and the multi-level subnet topology structure, and then obtain the layout setting based on a zoom operation performed by the user on a distance between a first network element in a subnet and a subordinate network element.

In a possible implementation, the step of determining the position of a subnet at the highest network level in the multi-level subnet topology structure based on the display area includes: determining the position of the subnet at the highest network level in the multi-level subnet topology structure according to an adjustment instruction of the user in the display area.

In the foregoing possible implementation, the user may manually drag each network element in the subnet at the highest network level in the display area to a desired position, and the user may further manually place a subnet at another network level in the multi-level subnet topology structure. The communication apparatus may correspondingly determine a position of the network element at the highest network level and a position of a network element at the other network level, and finally save the placement positions.

In a possible implementation, the step of determining the position of a subnet at the highest network level in the multi-level subnet topology structure based on the display area includes: determining the position of the subnet at the highest network level in the multi-level subnet topology structure based on the display area and a preset placement indication.

In the foregoing possible implementation, the position of the subnet at the highest network level in the multi-level subnet topology structure may be preset for any display area. The user may preset a preset placement instruction to indicate, to the communication apparatus, the placement position of the subnet at the highest network level in the multi-level subnet topology structure.

In a possible implementation, the step of expanding the subordinate network elements of the first network element includes: expanding the subordinate network elements of the first network element in a network level sequence of the network elements in the multi-level subnet topology structure.

In the foregoing possible implementation, if subordinate network elements of a network element in the current subnet include a first network element, where a product of a subnet density of the first network element and the foregoing scale is greater than the preset value, but there is still a network element whose subnet has not been expanded in the current subnet, a subnet of the first network element cannot be expanded.

A second aspect of embodiments of this application provides a communication apparatus that includes an obtaining unit configured to obtain a multi-level subnet topology structure, where the multi-level subnet structure includes network elements at a plurality of network levels; and obtain a layout setting of a subnet of a first network element at each network level, where the subnet of the first network element includes the first network element and subordinate network elements of the first network element, the layout setting is used to adjust a physical position of a subordinate network element of the first network element, and the physical position is an actual position of the subordinate network element of the first network element in an actual coordinate system. The communication apparatus further includes a determining unit configured to determine a subnet density of the first network element based on the layout setting, where the subnet density is a density of the subordinate network elements of the first network element in the actual coordinate system; and determine a scale based on a zoom operation performed by a user on a display area, where the scale represents a relationship of a display distance between network elements and a physical distance corresponding to the display distance, the display distance is a distance between network elements in the display area, and the physical distance is an actual distance between network elements in the actual coordinate system. The communication apparatus also includes an expanding unit configured to expand the subordinate network elements of the first network element when a product of the scale and the subnet density is greater than a preset value.

The communication apparatus is configured to perform the method in the first aspect or any implementation of the first aspect.

A third aspect of this application provides a communication device, including a processor, a memory, and a communication interface. The processor is configured to execute instructions stored in the memory, so that the communication device performs the method provided in any one of the first aspect or the optional manners of the first aspect. The communication interface is configured to receive or send an indication. For specific details of the communication device provided in the third aspect, refer to any one of the first aspect or the optional manners of the first aspect. Details are not described herein again.

A fourth aspect of this application provides a computer-readable storage medium. The computer-readable storage medium stores a program, and when a computer executes the program, the method provided in any one of the first aspect or the optional manners of the first aspect is performed.

A fifth aspect of this application provides a computer program product. When the computer program product is executed on a computer, the computer performs the method provided in any one of the first aspect or the optional manners of the first aspect.

DESCRIPTION OF EMBODIMENTS

Figure 1:
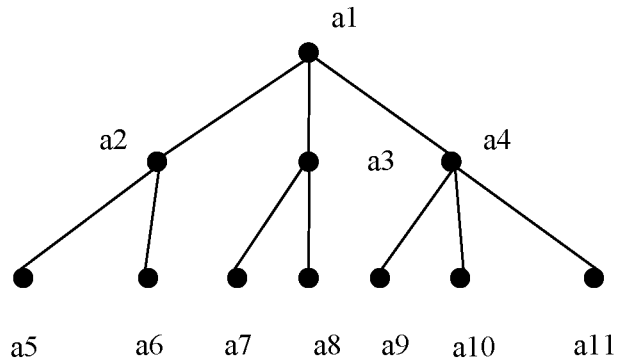
FIG. 1 is a diagram of an architecture of a tree subnet according to an embodiment of this application.

Embodiments of this application provide a network topology display method and a communication apparatus, to improve availability and visualization effect of a network management and control system.

The following describes embodiments of this application with reference to accompanying drawings. It is clear that the described embodiments are merely some but not all of embodiments of this application. A person of ordinary skill in the art may learn that, with technology development and emergence of a new scenario, the technical solutions provided in embodiments of this application are also applicable to a similar technical problem.

In the specification, claims, and accompanying drawings of this application, the terms "first", "second", and so on are intended to distinguish between similar objects but do not necessarily indicate a specific order or sequence. It should be understood that the data termed in such a way are interchangeable in proper circumstances, so that embodiments described herein can be implemented in other orders than the order illustrated or described herein. In addition, the terms "include" and "have" and any other variants are intended to cover the non-exclusive inclusion. For example, a process, method, system, product, or device that includes a list of steps or units is not necessarily limited to those expressly listed steps or units, but may include other steps or units not expressly listed or inherent to such a process, method, product, or device.

The specific term "example" herein means "used as an example, embodiment or illustration". Any embodiment described as "example" is not necessarily explained as being superior or better than other embodiments.

In addition, to better describe this application, numerous specific details are given in the following specific implementations. A person skilled in the art should understand that this application can also be implemented without some specific details. In some embodiments, methods, means, elements and circuits that are well-known to a person skilled in the art are not described in detail, so that the subject matter of this application is highlighted.

To facilitate understanding of the network topology display method provided in embodiments of this application, the following first explains the terms used in this specification.

Network level: Network elements are generally classified into different levels based on the importance of the network elements in an entire topology. A network level reflects the importance of a network element in a network. That is, a higher network level of a network element indicates higher importance of the network element in the network.

Ring subnet (also called ring): A ring subnet is a circular sub-network formed in a network where a loop starts from a starting ring element, passes through one or more elements via links, and reaches an ending ring element. A network element in a ring subnet is a ring network element. One of the ring network elements located at two endpoints of the circular network is a starting ring network element of the circular network, and the other ring network element is an ending ring network element of the circular network. In a ring subnet, a network element other than the starting ring network element and the ending ring network element is a ring subordinate network element. In addition, both the starting ring network element and the ending ring network element may be referred to as a home point of a corresponding ring subnet. In addition, when a ring subnet is a single-homed ring, because a starting ring network element and an ending ring network element of the ring subnet are the same, the single-homed ring has one home point.

A single-homed ring subnet (also called a single-homed ring) is a ring subnet in which a starting ring network element and an ending ring network element are a same network element. A dual-homed ring subnet (also called a dual-homed ring) is a ring subnet in which a starting ring network element and an ending ring network element are not a same network element. A same-level ring subnet (also called a same-level ring) is a ring subnet in which a starting ring network element and an ending ring network element have a same network level. A cross-level ring subnet (also called a cross-level ring) is a ring subnet in which a starting ring network element and an ending ring network element have different network levels.

Tree subnet: A tree subnet is a network formed by network elements that are connected in a tree shape. The network elements that belong to the tree subnet are tree network elements. For example, FIG. 1 is a diagram of an architecture of a tree subnet. The tree subnet includes a network element a1, a network element a2, a network element a3, a network element a4, a network element a5, a network element a6, a network element a7, a network element a8, a network element a9, a network element a10, and a network element a11. Subordinate network elements of the network element a1 are the network element a2, the network element a3, and the network element a4. Subordinate network elements of the network element a2 are the network element a5 and the network element a6. Subordinate network elements of the network element a3 are the network element a7 and the network element a8. Subordinate network elements of the network element a4 are the network element a9, the network element a10, and the network element a11. The network level of the network element a1 is 1, the network levels of the network element a2, the network element a3, and the network element a4 are 2, and the network levels of the network element a5, the network element a6, the network element a7, the network element a8, the network element a9, the network element a10, and the network element a11 are 3.

Core network element: A core network element is a network element that has the highest network level in a plurality of network elements included in a network.

Secondary network element: A secondary network element is a lower-level network element that is in a plurality of network elements included in a network and that is directly connected to a core network element.

Isolated network element (also called an isolated tree network element in this specification): An isolated network element is a network element that has no connection path to a core network element.

Inter-ring link: a link on which one of the two network elements located at the two ends of the link is a ring network element and the other is not.

Cluster: After secondary network elements are grouped based on connectivity between the secondary network elements, each remaining network element is grouped, based on a distance of a path from each remaining network element to the secondary network element, into a group in which a secondary network element corresponding to a nearest path is located. A set including the network elements and the links included in each group is referred to as a cluster. The remaining network element is a network element whose network level is lower than that of the secondary network element.

Inter-cluster link: A link on which the network elements located at two ends of the link belong to different clusters.

Subordinate network element of a network element: network elements connected to the network element.

Ring level: A level of a ring subnet is equal to 1 plus a larger value of a network level of a starting ring network element of the ring subnet and a network level of an ending ring network element.

During or after construction of a multi-level tree nested subnet topology structure, it is necessary to lay out a topology within a single subnet. A general method is to manually drag each node (a network element node and a lower-level subnet node) and save positions. Alternatively, a shortcut may be used (for example, a plurality of nodes are selected in batches and the nodes are automatically arranged into a ring or tree). After the multi-level tree nested subnet topology structure is constructed, the topology structures of all subnets can be viewed one by one. A traditional viewing manner is viewing a single subnet, that is, opening one subnet at a time to view a topology of the subnet. However, in the traditional approach, only a single subnet can be viewed at a time, and an overall network topology cannot be viewed, and a cross-subnet service path cannot be viewed. This restricts availability and visualization effect of a network management and control system.

To resolve the foregoing problem, an embodiment of this application provides a network topology display method. The method is described as follows.

Figure 2:
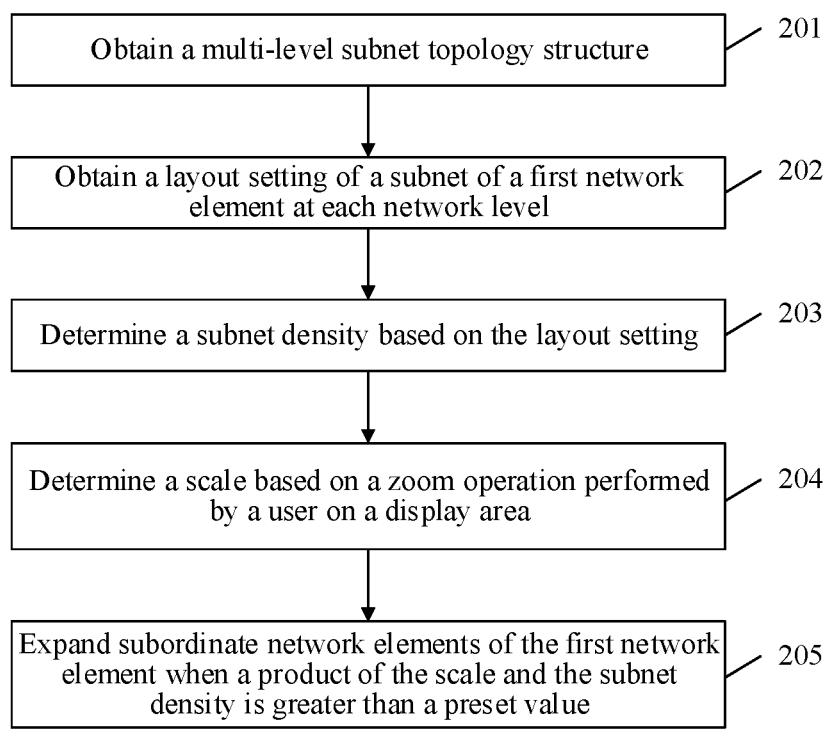
FIG. 2 is a schematic diagram of an embodiment of a network topology display method according to an embodiment of this application.

Refer to FIG. 2. FIG. 2 shows a network topology display method according to an embodiment of this application.

Step 201: Obtain a multi-level subnet topology structure.

In this embodiment of this application, the multi-level subnet topology structure may be manually constructed (that is, a network element and a connected network element are manually arranged), or may be automatically constructed according to a specific method. The multi-level subnet topology structure includes a plurality of network elements, that is, a connection relationship, and each network element has a corresponding network level.

Step 202: Obtain a layout setting of a subnet of a first network element at each network level.

In some embodiments of this application, the subnet of the first network element includes the first network element, subordinate network elements of the first network element, and a connection relationship between the network elements. The layout setting is obtained according to an adjustment instruction of a user for a physical position of a subordinate network element of the first network element. Specifically, the adjustment may be adjusting a physical position of one network element, or may be adjusting physical positions of a plurality of or all network elements in the subnet. This is not limited herein. The physical position is an actual position of the subordinate network element of the first network element in an actual coordinate system.

The user may adjust a physical position of a subordinate network element of the first network element at each network level based on a requirement of the user. This embodiment of this application may be performed by a communication apparatus. After the user adjusts a scale of a network element, the communication apparatus may obtain a layout setting corresponding to the network element.

Optionally, an approach in which the communication apparatus obtains the layout setting may be: determining a position of a subnet at a highest network level in the multi-level subnet topology structure based on a display area, and obtaining a layout setting of a subnet at another network level based on the position of the subnet at the highest network level.

To obtain a better layout design of the multi-level subnet topology structure, the position of the subnet at the highest network level in the multi-level subnet topology structure further needs to be determined. The subnet at the highest network level includes a network element at the highest network level, subordinate network elements of the network element, and connection relationships between the network element and the subordinate network elements. The communication apparatus may arrange a subnet at another network level based on the position of the subnet at the highest network level and the multi-level subnet topology structure, and then obtain the layout setting based on a zoom operation performed by the user on a distance between a first network element in a subnet and a subordinate network element. Optionally, the user may alternatively adjust only physical positions of one or more network elements in the subordinate network elements of the first network element. This is not limited herein.

Optionally, the communication apparatus may determine the position of the subnet at the highest network level in the multi-level subnet topology structure according to an adjustment instruction of the user in the display area. Specifically, the user may manually drag each network element in the subnet at the highest network level in the display area to a desired position, and the user may further manually place a subnet at another network level in the multi-level subnet topology structure. The communication apparatus may correspondingly determine a position of the network element at the highest network level and a position of a network element at the other network level, and finally save the placement positions.

Optionally, the communication apparatus may alternatively determine the position of the subnet at the highest network level in the multi-level subnet topology structure based on the display area and a preset placement indication. Specifically, after obtaining the multi-level subnet topology structure, the communication apparatus may adjust, based on the preset placement indication, a position of the subnet at the highest network level in the multi-level subnet topology structure in the display area. For example, the preset placement indication may indicate to place the network element at the highest network level at a top or middle position in the display area, and arrange the subordinate network elements of the network element at the highest network level based on a required spatial distance. This is not limited herein. After the position of the subnet at the highest network level in the display area is determined, a space range of a secondary subnet is calculated, then the secondary subnet is narrowed down and moved to a space range of the subnet at the highest network level, then a still-lower-level subnet and a subnet at another network level are processed in a nested manner, and finally the positions are saved.

Figure 3:
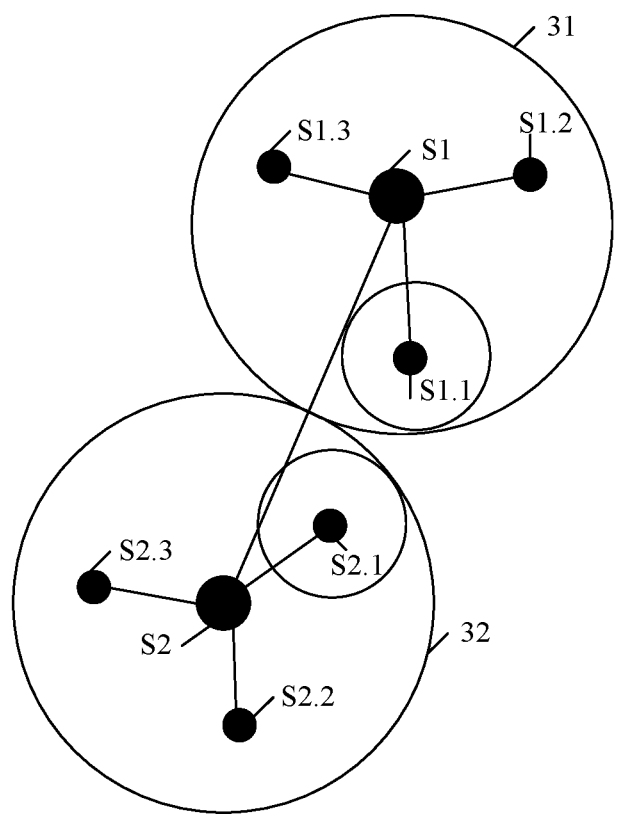
FIG. 3 is a schematic diagram of a space range according to an embodiment of this application.

For example, as shown in a schematic diagram of a space range in FIG. 3, in the multi-level subnet topology structure, the first-level network elements include S1 and S2, the subordinate network elements of S1 include S1.1, S1.2, and S1.3, and the subordinate network elements of S2 include S2.1, S2.2, and S2.3. After the positions of the subordinate network elements of S1 and S2, network element at the highest network level are determined, a space range of a subnet of S1 and a space range of a subnet of S2 may be calculated. A specific calculation manner is not limited herein provided that the space range of the subnet of S1 and the space range of the subnet of S2 do not affect each other. As shown in FIG. 3, a circle block 31 represents the space range of the subnet of S1, and a circle block 32 represents the space range of the subnet of S2. A space range, for example, a circle block of a subnet of a subordinate network element of S1 can only be within the circle block 31, and a space range, for example, a circle block of a subnet of a subordinate network element of S2 can only be within the circle block 32.

Figure 4A:
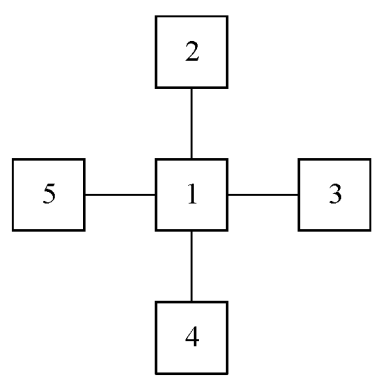
FIG. 4(a) is a schematic diagram of a layout setting according to an embodiment of this application.
Figure 4B:
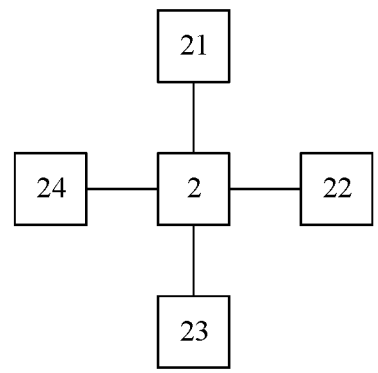
FIG. 4(b) is another schematic diagram of a layout setting according to an embodiment of this application.
Figure 4C:
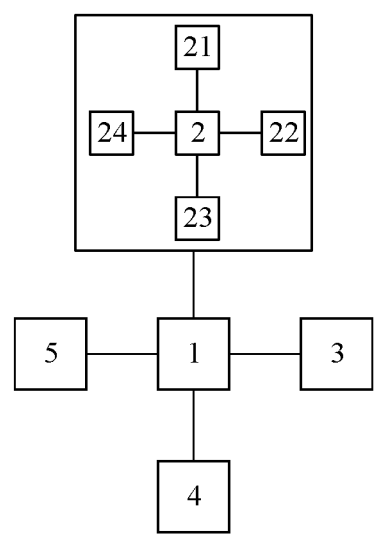
FIG. 4(c) is another schematic diagram of a layout setting according to an embodiment of this application.

A process in which the communication apparatus obtains the layout setting based on a zoom operation performed by the user on a distance between a first network element in a subnet and a subordinate network element may be as shown in FIG. 4(a). A network element at the highest network level is a network element 1, and the subordinate network elements of the network element 1 are a network element 2, a network element 3, a network element 4, and a network element 5. As shown in FIG. 4(b), the subordinate network elements of the network element 2 are a network element 21, a network element 22, a network element 23, and a network element 24. The user may zoom out a subordinate network element structure of the network element 2 and move the structure to the network element 2 in FIG. 4(a), to form FIG. 4(c). The user may zoom in or out a subnet including the network element 2 and the subordinate network elements of the network element 2. A zoom amplitude corresponds to the foregoing layout setting. Compared with the network element 3, the network element 4, and the network element 5, a scale of the subnet including the network element 2 and the subordinate network elements of the network element 2 in a display area of FIG. 4(c) changes based on the layout setting. For example, if the subnet is zoomed in, in FIG. 4(c), the physical distances corresponding to a same display distance in the network element 3, the network element 4, and the network element 5 remain unchanged, but the physical distance corresponding to the same display distance in the network element 2 increases.

Optionally, the user may alternatively directly configure the physical positions of all network elements manually, and the communication apparatus may determine the layout setting according to a saving instruction of the user.

Step 203: Determine a subnet density based on the layout setting.

In some embodiments of this application, a placement result obtained after any subnet is adjusted based on a layout setting has a corresponding subnet density, and the subnet density is a density of subordinate network elements of a first network element in an actual coordinate system after the subnet is adjusted based on the layout setting. The communication apparatus may determine a final layout setting based on final placement positions saved by the user, to obtain a subnet density corresponding to the final layout setting. The subnet density is a subnet density of the network element at the highest network level in the subnet.

Optionally, the subnet density is a ratio of an actual coordinate range of the subordinate subnet of the first network element in the actual coordinate system to a quantity of subordinate network elements of the first network element. Specifically, the subnet density may be obtained by dividing a two-dimensional coordinate range of nodes in the subnet by a quantity of network elements in the subnet ((Xmax−Xmin)*(Ymax−Ymin)/the quantity of network elements).

Optionally, the subnet density is an average value of the connection lengths between the subordinate network elements of the first network element in the actual coordinate system. Specifically, the subnet density may be obtained by the communication apparatus by calculating an average connection length between network elements in the subnet, that is, calculating an average length of all topological connections in the subnet.

Step 204: Determine a scale based on a zoom operation performed by the user on the display area.

In some embodiments of this application, when viewing a subnet at a network level, if the user wants to view a subnet subordinate to a network element in the subnet, the user may perform a zoom-in operation on a current display area. The zoom-in of the area changes a scale of a current display distance between network elements in the subnet subordinate to the network element and a physical distance corresponding to the current display distance, and the communication apparatus may determine a scale based on a zoom instruction determined by the user. The scale represents a relationship of a display distance between network elements and a physical distance corresponding to the display distance. The display distance is a distance between network elements in the display area, and the physical distance is an actual distance between network elements in the actual coordinate system. For example, map display is used as an example. A scale of 1:1 KM on a map indicates that a ratio of a distance between two nodes on the map to a distance between the two nodes in reality is 1:1 KM.

Step 205: When a product of the scale and the subnet density is greater than a preset value, expand the subordinate network elements of the network element corresponding to the subnet density.

In some embodiments of this application, after determining the scale, the communication apparatus may perform calculation for the scale and a subnet density of each network element in a current subnet. When a product of the scale and a subnet density is greater than the preset value, a subnet of a network element corresponding to the subnet density is expanded.

Optionally, the communication apparatus expands, in a network level sequence of the network elements in the multi-level subnet topology structure, the subordinate network elements of the network element corresponding to the density. To be specific, if the subordinate network elements of a network element in the current subnet include a first network element, where a product of a subnet density of the first network element and the foregoing scale is greater than the preset value, but there is still a network element whose subnet has not been expanded in the current subnet, a subnet of the first network element cannot be expanded.

For example, in some embodiments of this application, there are two coordinate systems. One is the actual coordinate system: Each network element has a pair of coordinates in the actual coordinate system, and the coordinates of each network element do not change during zooming and translation. The other is a display coordinate system: Each network element corresponds to a pair of screen display coordinates in a static state, and the display coordinates of the network element change during zooming and translation by a user. However, a zoom operation does not change the actual coordinates of a node, but only changes the display coordinates, and also changes the scale of an actual distance and a display coordinate distance.

Figure 5A:
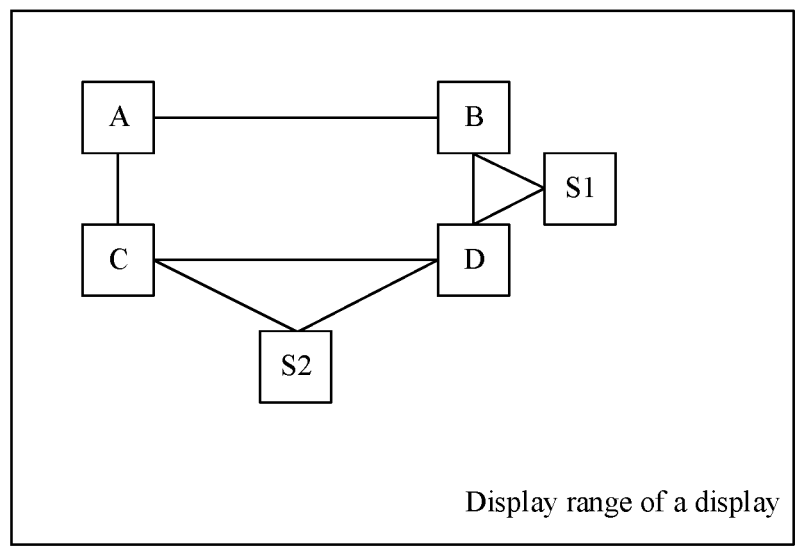
FIG. 5(a) is a schematic diagram of a display result according to an embodiment of this application.
Figure 5B:
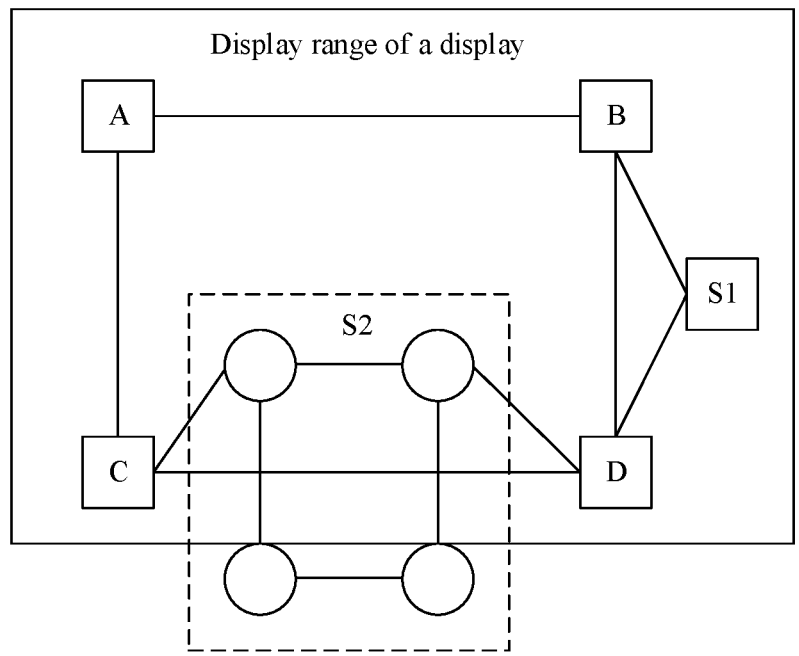
FIG. 5(b) is another schematic diagram of a display result according to an embodiment of this application.
Figure 5C:
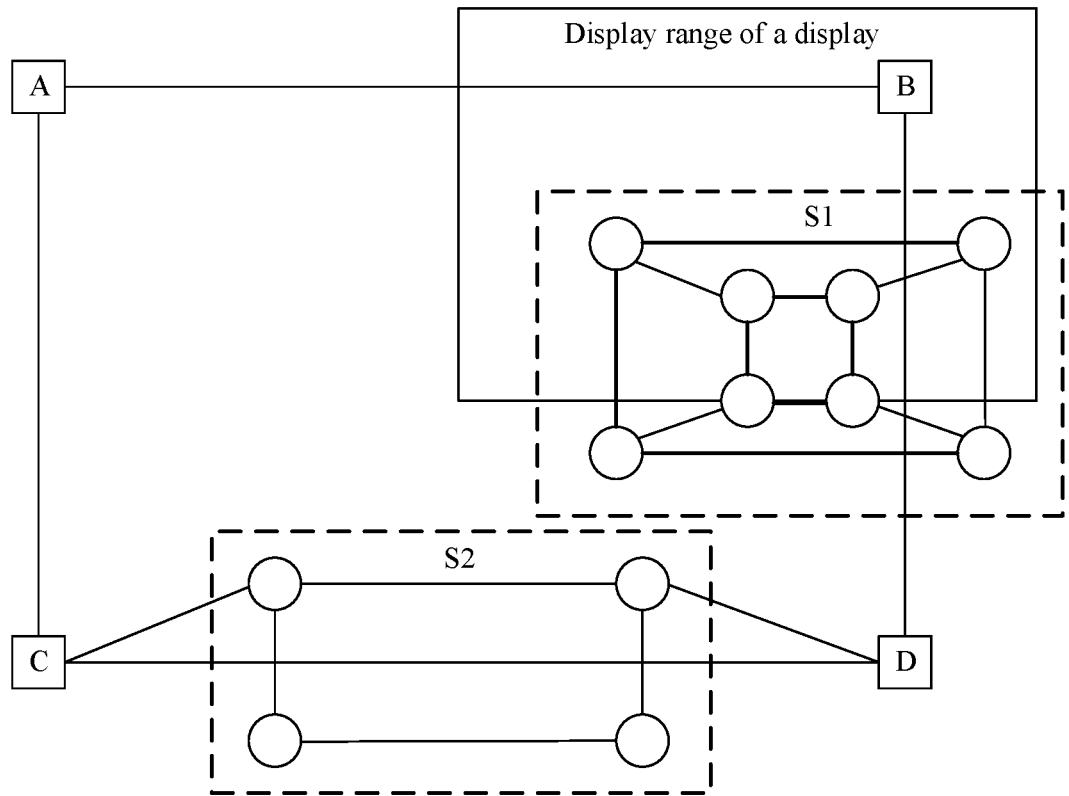
FIG. 5(c) is another schematic diagram of a display result according to an embodiment of this application.

For example, it is assumed that the current subnet includes the network elements A, B, C, D, S1, and S2, the network element S1 has four subordinate network elements, a subnet density of the network element S1 is 6, the network element S2 has eight subordinate network elements, and a subnet density of the network element S2 is 10. FIG. 5(a) shows a display result. When the user does not zoom in in the current subnet, the lower-level topologies in the current subnet are hidden. A current display range of a display displays only the network elements A, B, C, D, S1, and S2 and connections thereof. In this case, a scale is a display distance: a physical distance=1:15. As shown in FIG. 5(b), when the user zooms in the current subnet, the display distance remains unchanged, but the physical distance is reduced. In this case, the display distance: the physical distance=1:6. In an example in which the preset value is 1, a product of the subnet density of the network element S2 and the scale is greater than 1, and therefore the subordinate network elements of the network element S2 are expanded; and a product of the subnet density of the network element S1 and the scale is not greater than 1, and therefore the subordinate network elements of the network element S1 continue to be hidden. As shown in FIG. 5(c), the user zooms in in the current subnet again, and the physical distance is further reduced. In this case, the display distance: the physical distance=1:3, the product of the subnet density of the network element S1 and the scale is greater than 1, and therefore the subordinate network elements of the network element S1 are expanded. A specific value of the preset value may be set by the user based on a requirement of the user.

A density of network elements at each network level is obtained, and then a scale of a display coordinate distance and a corresponding physical coordinate distance is determined based on a zoom operation of the user. When the scale is less than the density of a network element, a subnet of the network element is expanded. In this way, a network topology may be viewed across levels and network elements, thereby improving availability and visualization effect of a network management and control system.

A network topology display method is described above, and a communication apparatus that performs the method is described below.

Figure 6:
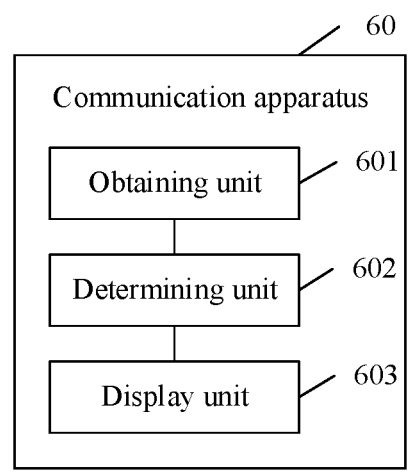
FIG. 6 is a schematic diagram of a structure of a communication apparatus according to an embodiment of this application.

FIG. 6 shows a communication apparatus according to an embodiment of this application. Here term "unit" may refer to a hardware component or a module implemented in software or a combination of hardware and software. The communication apparatus 60 includes:

an obtaining unit 601, configured to: obtain a multi-level subnet topology structure, where the multi-level subnet structure includes network elements at a plurality of network levels and obtain a layout setting of a subnet of a first network element at each network level, where the subnet of the first network element includes the first network element and subordinate network elements of the first network element, the layout setting is used to adjust a physical position of a subordinate network element of the first network element, and the physical position is an actual position of the subordinate network element of the first network element in an actual coordinate system;

a determining unit 602, configured to: determine a subnet density of the first network element based on the layout setting, where the subnet density is a density of the subordinate network elements of the first network element in the actual coordinate system; and determine a scale based on a zoom operation performed by a user on a display area, where the scale represents a relationship of a display distance between network elements and a physical distance corresponding to the display distance, the display distance is a distance between network elements in the display area, and the physical distance is an actual distance between network elements in the actual coordinate system; and an expanding unit 603, configured to expand the subordinate network elements of the first network element when a product of the scale and the subnet density is greater than a preset value.

Optionally, the subnet density is a ratio of an actual coordinate range of the subnet of the first network element in the actual coordinate system to a quantity of subordinate network elements of the first network element.

Optionally, the subnet density is an average value of connection lengths between the subordinate network elements of the first network element in the actual coordinate system.

Optionally, the obtaining unit 601 is configured to:
determine a position of a subnet at a highest network level in the multi-level subnet topology structure based on the display area, where the subnet at the highest network level includes a network element at the highest network level and subordinate network elements of the network element at the highest network level; and
obtain a layout setting of a subnet of the first network element at another network level based on the position of the subnet at the highest network level.

Optionally, the obtaining unit 601 is configured to:
determine the position of the subnet at the highest network level in the multi-level subnet topology structure according to an adjustment instruction of the user in the display area.

Optionally, the obtaining unit 601 is configured to:
determine the position of the subnet at the highest network level in the multi-level subnet topology structure based on the display area and a preset placement indication.

Optionally, the expanding unit 603 is configured to:
expand the subordinate network elements of the first network element in a network level sequence of the network elements in the multi-level subnet topology structure.

Figure 7:
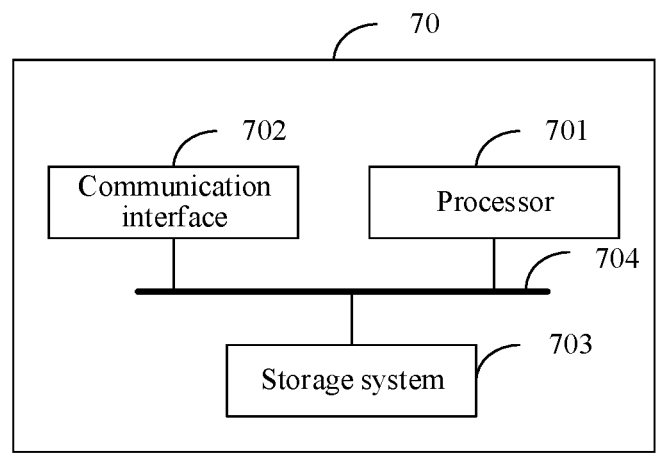
FIG. 7 is another schematic diagram of a structure of a communication device according to an embodiment of this application.

FIG. 7 is a schematic diagram of a logical structure of a communication device 70 according to an embodiment of this application. The communication device 70 includes a processor 701, a communication interface 702, a storage system 703, and a bus 704. The processor 701, the communication interface 702, and the storage system 703 are connected to each other by using the bus 704. In this embodiment of this application, the processor 701 is configured to control and manage an action of the communication device 70. For example, the processor 701 is configured to perform the steps performed by the communication device in the method embodiment in FIG. 2. The communication interface 702 is configured to support the communication device 70 in performing communication. The storage system 703 is configured to store program code and data of the communication device 70.

The processor 701 may be a central processing unit, a general-purpose processor, a digital signal processor, an application-specific integrated circuit, a field programmable gate array or another programmable logical device, a transistor logical device, a hardware component, or any combination thereof. The processor may implement or execute various example logical blocks, modules, and circuits described with reference to content disclosed in this application. Alternatively, the processor 701 may be a combination of processors implementing a computing function, for example, a combination of one or more microprocessors, or a combination of a digital signal processor and a microprocessor. The bus 704 may be a peripheral component interconnect (PCI) bus, an extended industry standard architecture (EISA) bus, or the like. Buses may be classified into an address bus, a data bus, a control bus, and the like. For ease of representation, only one bold line is used for representation in FIG. 7, but this does not mean that there is only one bus or only one type of bus.

In some embodiments, the obtaining unit 601, the determining unit 602, and the expanding unit 603 in the communication apparatus 60 are equivalent of the processor 701 in the communication device 70.

The communication device 70 in this embodiment may be corresponding to the communication apparatus in the method embodiment in FIG. 2. The communication interface 702 in the communication device 70 may implement functions and/or various steps implemented by the communication apparatus in the method embodiment in FIG. 2. For brevity, details are not described herein again.

In another embodiment of this application, a computer-readable storage medium is further provided. The computer-readable storage medium stores a computer-executable instruction. When a processor of a device executes the computer-executable instruction, the device performs the steps of the network topology display method performed by the communication apparatus in FIG. 2.

In another embodiment of this application, a computer program product is further provided. The computer program product includes a computer-executable instruction, and the computer-executable instruction is stored in a computer-readable storage medium. When a processor of a device executes the computer-executable instruction, the device performs the steps of the network topology display method performed by the communication apparatus in FIG. 2.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatuses, and methods may be implemented in other manners. For example, the described apparatus embodiment is merely an example. For example, division into the units may be merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of this application essentially, or the part contributing to the current technology, or all or some of the technical solutions may be implemented in the form of a software product. The computer software product is stored in a storage medium and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

What is claimed is:

1. A network topology display method, comprising:
   obtaining a multi-level subnet topology structure, wherein the multi-level subnet topology structure comprises network elements at a plurality of network levels;
   obtaining a layout setting of a subnet of a first network element at each network level, wherein the subnet of the first network element comprises the first network element and subordinate network elements of the first network element, the layout setting is used to adjust a physical position of a subordinate network element of the first network element, and the physical position is an actual position of the subordinate network element of the first network element in an actual coordinate system;
   determining a subnet density of the first network element based on the layout setting, wherein the subnet density is a density of the subordinate network elements of the first network element in the actual coordinate system;
   determining a scale based on a zoom operation performed by a user on a display area, wherein the scale represents a relationship of a display distance between any two network elements and a physical distance corresponding to the display distance, the display distance is a distance between the any two network elements in the display area, and the physical distance is an actual distance between the any two network elements in the actual coordinate system; and
   expanding the subordinate network elements of the first network element when a product of the scale and the subnet density is greater than a preset value.

2. The network topology display method according to claim 1, wherein the subnet density is a ratio of an actual coordinate range of the subnet of the first network element in the actual coordinate system to a quantity of subordinate network elements of the first network element.

3. The network topology display method according to claim 1, wherein the subnet density is an average value of connection lengths between the subordinate network elements of the first network element in the actual coordinate system.

4. The network topology display method according to claim 1, wherein the obtaining a layout setting of a subnet of a first network element at each network level comprises:

determining a position of a subnet at a highest network level in the multi-level subnet topology structure based on the display area, wherein the subnet at the highest network level comprises a network element at the highest network level and subordinate network elements of the network element at the highest network level; and obtaining a layout setting of a subnet of the first network element at another network level based on the position of the subnet at the highest network level.

5. The network topology display method according to claim 4, wherein the determining of the position of the subnet at the highest network level in the multi-level subnet topology structure based on the display area comprises:

determining the position of the subnet at the highest network level in the multi-level subnet topology structure according to an adjustment instruction of the user in the display area.

6. The network topology display method according to claim 4, wherein the determining of the position of the subnet at the highest network level in the multi-level subnet topology structure based on the display area comprises:

determining the position of the subnet at the highest network level in the multi-level subnet topology structure based on the display area and a preset placement indication.

7. The network topology display method according to claim 1, wherein the expanding of the subordinate network elements of the first network element comprises:

expanding the subordinate network elements of the first network element in a network level sequence of the network elements in the multi-level subnet topology structure.

8. A communication apparatus, comprising:

a memory storing instructions; and a processor coupled to the memory to execute the instructions to:

obtain a multi-level subnet topology structure, wherein the multi-level subnet topology structure comprises network elements at a plurality of network levels;

obtain a layout setting of a subnet of a first network element at each network level, wherein the subnet of the first network element comprises the first network element and subordinate network elements of the first network element, the layout setting is used to adjust a physical position of a subordinate network element of the first network element, and the physical position is an actual position of the subordinate network element of the first network element in an actual coordinate system;

determine a subnet density of the first network element based on the layout setting, wherein the subnet density is a density of the subordinate network elements of the first network element in the actual coordinate system; and determine a scale based on a zoom operation performed by a user on a display area, wherein the scale represents a relationship of a display distance between network elements and a physical distance corresponding to the display distance, the display distance is a distance between network elements in the display area, and the physical distance is an actual distance between network elements in the actual coordinate system; and expand the subordinate network elements of the first network element when a product of the scale and the subnet density is greater than a preset value.

9. The communication apparatus according to claim 8, wherein the subnet density is a ratio of an actual coordinate range of the subnet of the first network element in the actual coordinate system to a quantity of subordinate network elements of the first network element.

10. The communication apparatus according to claim 8, wherein the subnet density is an average value of connection lengths between the subordinate network elements of the first network element in the actual coordinate system.

11. The communication apparatus according to claim 8, wherein the processor coupled to the memory executes the instructions further to:

determine a position of a subnet at a highest network level in the multi-level subnet topology structure based on the display area, wherein the subnet at the highest network level comprises a network element at the highest network level and subordinate network elements of the network element at the highest network level; and obtain a layout setting of a subnet of the first network element at another network level based on the position of the subnet at the highest network level.

12. The communication apparatus according to claim 11, wherein the processor coupled to the memory executes the instructions further to:

determine the position of the subnet at the highest network level in the multi-level subnet topology structure according to an adjustment instruction of the user in the display area.

13. The communication apparatus according to claim 11, wherein the processor coupled to the memory executes the instructions further to:

determine the position of the subnet at the highest network level in the multi-level subnet topology structure based on the display area and a preset placement indication.

14. The communication apparatus according to claim 8, wherein the processor coupled to the memory executes the instructions further to:

expand the subordinate network elements of the first network element in a network level sequence of the network elements in the multi-level subnet topology structure.

* * * * *